(12) United States Patent
Chen et al.

(10) Patent No.: US 11,648,808 B2
(45) Date of Patent: May 16, 2023

(54) TIRE PRESSURE SENSOR AND BURNING DEVICE AND BURNING METHOD THEREOF

(71) Applicant: ORANGE ELECTRONIC CO., LTD, Taichung (TW)

(72) Inventors: Ji-Liang Chen, Taichung (TW); Ching-Hsiang Chang, Taichung (TW)

(73) Assignee: ORANGE ELECTRONIC CO., LTD, Taichung (TW)

( * ) Notice: Subject to any disclaimer, the term of this patent is extended or adjusted under 35 U.S.C. 154(b) by 350 days.

(21) Appl. No.: 16/942,517

(22) Filed: Jul. 29, 2020

(65) Prior Publication Data

US 2021/0101422 A1  Apr. 8, 2021

(30) Foreign Application Priority Data

Oct. 3, 2019 (TW) ................. 108135890
Apr. 8, 2020 (TW) ................. 109111741

(51) Int. Cl.
*B60C 23/04* (2006.01)
*G01L 17/00* (2006.01)
(Continued)

(52) U.S. Cl.
CPC ...... *B60C 23/0471* (2013.01); *B60C 23/0433* (2013.01); *B60C 23/0488* (2013.01);
(Continued)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413;
(Continued)

(56) References Cited

U.S. PATENT DOCUMENTS 9,604,510 B2    3/2017  Yu
2020/0156421 A1*  5/2020  Cheng ................. H04L 67/34
2021/0037118 A1*  2/2021  Yu .................... G06F 13/4282

FOREIGN PATENT DOCUMENTS

CN       107878128 A   *  4/2018  ............. B60C 23/04
DE   102018133097 B4   * 10/2020
(Continued)

*Primary Examiner* — Andre J Allen
(74) *Attorney, Agent, or Firm* — Muncy, Geissler, Olds & Lowe, P.C.

(57) ABSTRACT

The present disclosure discloses a tire pressure sensor burning device for burning at least one tire pressure sensor having or being externally inputted an exclusive code and a joint code. The tire pressure sensor burning device includes a burning tool in which a communication protocol is stored, and the burning tool includes a transmitting unit connected with the tire pressure sensor and sending a switch command thereto for switching the mode of the tire pressure sensor from the exclusive code to the joint code. The burning tool sends a burning command to the tire pressure sensor with the transmitting unit, and unilaterally burns the communication protocol into the tire pressure sensor via the joint code.

22 Claims, 5 Drawing Sheets

(51) Int. Cl.
  *H04W 4/48* (2018.01)
  *G01L 19/00* (2006.01)
  *G06K 7/14* (2006.01)
  *H04L 67/12* (2022.01)

(52) U.S. Cl.
  CPC .......... *G01L 17/00* (2013.01); *G01L 19/0092* (2013.01); *G06K 7/1413* (2013.01); *H04L 67/12* (2013.01); *H04W 4/48* (2018.02)

(58) Field of Classification Search
  CPC ... B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
  USPC ................................. 73/146–146.8
  See application file for complete search history.

(56) References Cited

FOREIGN PATENT DOCUMENTS

| | | | |
|---|---|---|---|
| TW | I543887 B | | 8/2016 |
| TW | I558580 B | | 11/2016 |
| TW | I573702 B | * | 3/2017 |

* cited by examiner

TIRE PRESSURE SENSOR AND BURNING DEVICE AND BURNING METHOD THEREOF

RELATED APPLICATIONS

This application claims priority to Taiwan Application Serial Number 108135890 filed on Oct. 3, 2019, and 109111741 filed on Apr. 8, 2020, which are herein incorporated by reference.

BACKGROUND

Technical Field

The present disclosure relates to a burning device and a burning method for a tire pressure sensor, and in particular to a burning device and a burning method for a tire pressure sensor which unilaterally burn a communication protocol into the tire pressure sensors via a joint code.

DESCRIPTION OF RELATED ART

The tire pressure sensors are indispensable for today's cars and vehicles. A communication protocol applicable to the tire pressure sensors of each car model is burned thereto in advance before the cars or vehicles are sold to consumers. On the other hand, the downstream service factories or the manufacturers of the tire pressure sensor implant the communication protocols into these tire pressure sensors which are corresponding to different car models.

For the burning method, in the past, the tire pressure sensor was specifically identified by a burning device, and thereafter the communication protocol was transmitted one-to-one and sequentially. During this process of burning, the burning device continuously sends commands that request the tire pressure sensor to reply whether a complete packet has been received. This mechanism makes the burning process quite time-consuming.

The main cause of the above shortcomings is that, since the identification codes of each tire pressure sensor are different, a confirmation mechanism is provided to check the communication protocol is correctly transmitted to the target tire pressure sensor, rather than being erroneously received by other tire pressure sensors. However, the above-mentioned confirmation mechanism is obviously not necessary in the case that the same communication protocol is to be burned to multiple tire pressure sensors, and only causes meaningless inefficiency.

SUMMARY

According to one aspect of the present disclosure, a tire pressure sensor burning device is for burning at least one tire pressure sensor having or being externally inputted an exclusive code and a joint code. The tire pressure sensor burning device includes a burning tool in which a communication protocol corresponding to a car model is stored, and the burning tool includes a transmitting unit connected with the tire pressure sensor and sending a switch command thereto for switching the mode of the tire pressure sensor from the exclusive code to the joint code. The burning tool sends a burning command to the tire pressure sensor with the transmitting unit, and unilaterally burns the communication protocol into the tire pressure sensor via the joint code.

According to another aspect of the present disclosure, a tire pressure sensor burning method is for burning at least one tire pressure sensor having or being externally inputted an exclusive code and a joint code. The tire pressure sensor burning method includes the following steps. Providing a burning tool in which a communication protocol corresponding to a car model is stored. Providing a transmitting unit.

Operating the transmitting unit to communicatively connect to the tire pressure sensor and thus send a switch command thereto for switching the mode of the tire pressure sensor from the exclusive code to the joint code. Operating the transmitting unit to send a burning command to the tire pressure sensor. Based on the burning command, burning the communication protocol unilaterally into the tire pressure sensor.

According to yet another aspect of the present disclosure, a tire pressure sensor is for receiving a communication protocol corresponding to a car model. The tire pressure sensor includes a memory and a transceiving unit. The memory store or be input from outside an exclusive code and a joint code. The transceiving unit is for receiving a switch command and a burning command. When the transceiving unit receives the switch command, the tire pressure sensor switches the mode from the exclusive code to the joint code. When the transceiving unit receives the burning command, the tire pressure sensor unilaterally receives the communication protocol.

According to still another aspect of the present disclosure, a tire pressure sensor is for receiving a communication protocol corresponding to a car model. The tire pressure sensor includes a memory, a transceiving unit, a power module, a CPU, a voltage sensing unit, an acceleration sensing unit, a tire pressure sensing unit and a temperature sensing unit. The memory stores or be input from outside a first identification code and a second identification code, and the first identification code or the second identification code is applicable for receiving the communication protocol. The transceiving unit is for receiving external signals. The power module is configured to supply power to the tire pressure sensor. The CPU is connected with the memory, the transceiving unit and the power module. The voltage sensing unit is for sensing a voltage value of the tire pressure sensor and connecting with the CPU to transmit the voltage value thereto. The acceleration sensing unit is for sensing an acceleration value of the tire pressure sensor and connecting with the CPU to transmit the acceleration value thereto. The tire pressure sensing unit is for sensing a pressure value of the tire pressure sensor and connecting with the CPU to transmit the pressure value thereto. The temperature sensing unit is for sensing a temperature value of the tire pressure sensor and connecting with the CPU to transmit the temperature value thereto.

BRIEF DESCRIPTION OF THE DRAWINGS

The disclosure can be more fully understood by reading the following detailed description of the embodiment, with reference made to the accompanying drawings as follows.

DETAILED DESCRIPTION

The following is the description of the present disclosure according the drawings. For describing precisely, the details in practice will be introduced as below, but the details should not be a limitation of the present disclosure. Namely, the details introduced in the specification are optional. Moreover, for simplifying the drawings, the conventional structures or members will be shown briefly therein, and the repeated members will be labeled as the same number.

Figure 1:
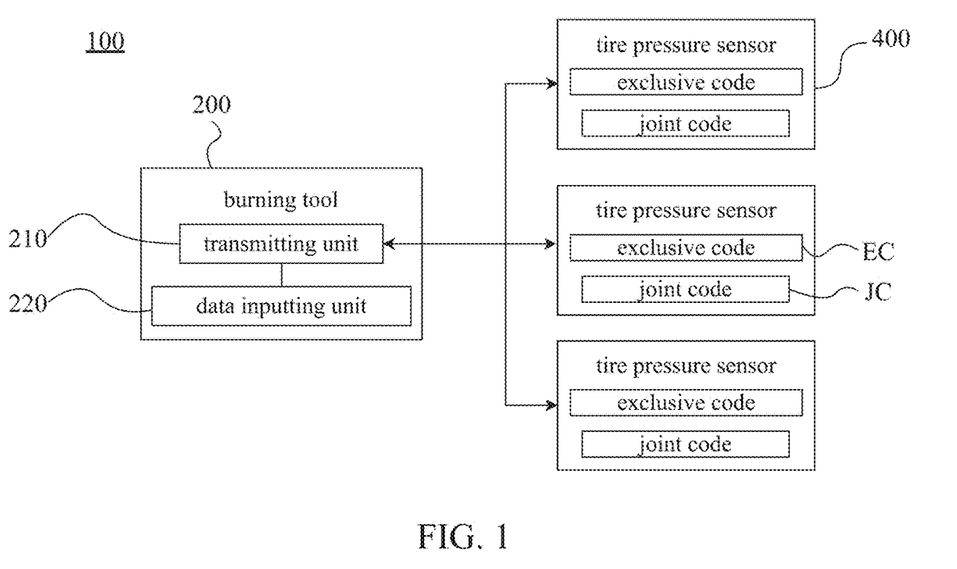
FIG. 1 is a block diagram of a tire pressure sensor burning device according to one embodiment of the present disclosure.

Please refer to FIG. 1, a tire pressure sensor burning device 100 includes a burning tool 200 which further includes a transmitting unit 210. The burning tool 200 stores a communication protocol corresponding to a car model, and the burning tool 200 is capable of burning one or more tire pressure sensors 400 concurrently. The burning tool may be a mobile phone, a PDA or a tablet computer, but should not be limited as described herein. The tire pressure sensor burning device 100 may further include a power supply device (or battery), a controller, a human machine interface or a reader of serial numbers. The mentioned components may be designed by those with ordinary skills in the art according to requirements, and therefore they are not shown in FIG. 1.

Figure 2:
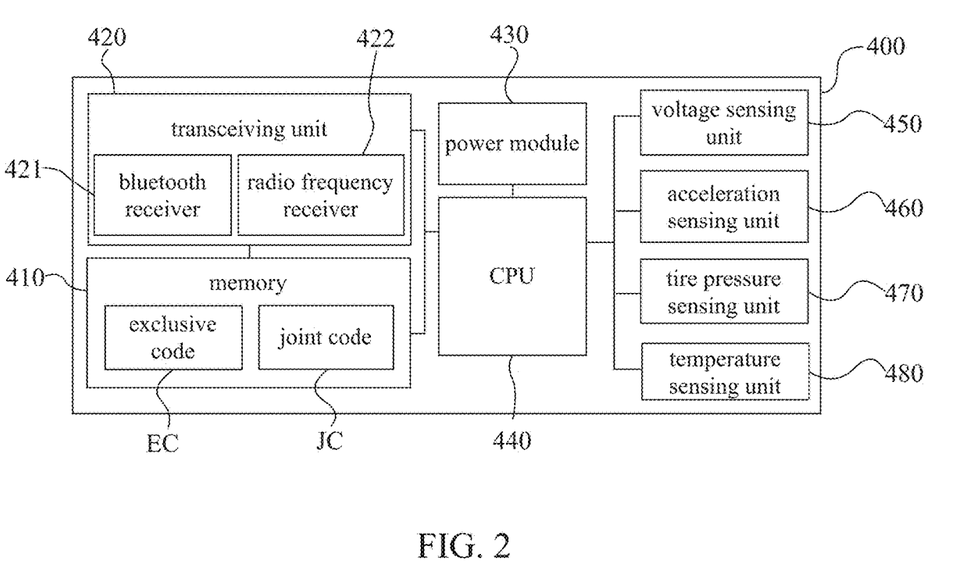
FIG. 2 is a block diagram of a tire pressure sensor according to another embodiment of the present disclosure.

Referring to FIG. 2, each of the tire pressure sensor 400 has a memory 410 in which an exclusive code EC and a joint code JC are stored. These exclusive codes EC corresponding to each tire pressure sensor 400 are different, however, the joint code JC is common to all of the tire pressure sensors 400. Both the exclusive code EC and the joint code JC can be stored in the memory 410 in advance or provided externally. For instance, the burning tool 200 may further include a data inputting unit 220 which can be a wireless receiver, a camera lens, a recorder or a keyboard, but not limited as described herein. The data inputting unit 220 is available for inputting or externally receiving the exclusive code EC or the joint code JC from the outside of the burning tool 220. Moreover, the data inputting unit 220 is communicatively connected with the transmitting unit 210 to write the exclusive code EC or the joint code JC into the tire pressure sensor 400.

Preferably, the data inputting unit 220 may be a bar code scanner, and the exclusive code EC is displayed on the tire pressure sensor 400 in the form of a bar code. In this way, the exclusive code EC can be obtained quickly by the burning tool 200 by scanning.

Figure 3:
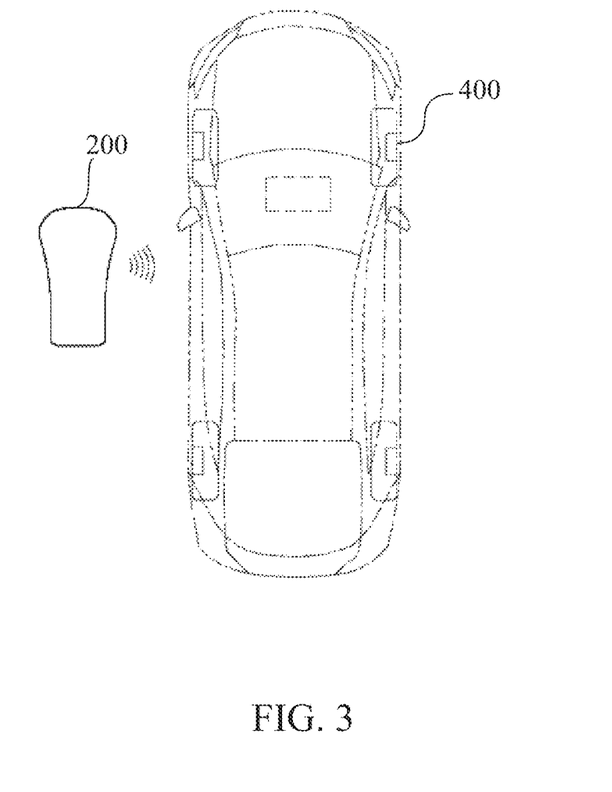
FIG. 3 is a schematic diagram showing reading an exclusive code of the tire pressure sensor of FIG. 1.
Figure 4:
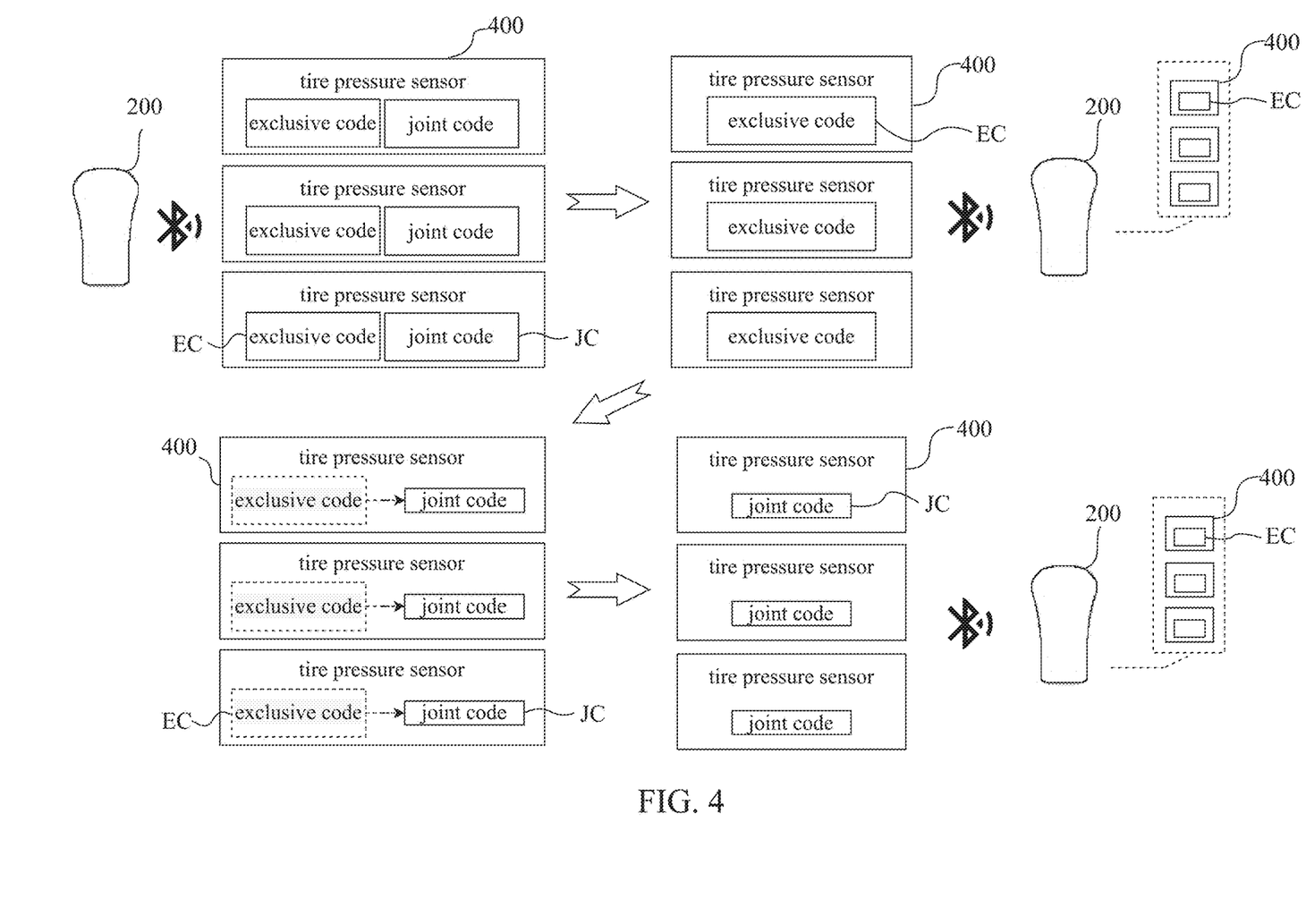
FIG. 4 is a schematic diagram showing switching the mode of the tire pressure sensor of FIG. 1.

Next to FIG. 3 and FIG. 4, the burning tool 200 is connected with the tire pressure sensor 400 and sending a switch command thereto with the transmitting unit 210. In the preferred embodiment depicted in FIG. 4, the transmitting unit 210 first sends a trigger command to each of the tire pressure sensors 400 for requesting the tire pressure sensors 400 to reply the exclusive codes thereof, so as each of the tire pressure sensor 400 can be recognized. Simultaneously, the exclusive code EC of each tire pressure sensor 400 can be instantly displayed on the burning tool 200, and the operator can select the target tire pressure sensor 400 to be burned by touching. Afterwards, according to the operator's selection, the transmitting unit 210 sends the switch command to all of the tire pressure sensors 400. Because each of the tire pressure sensor 400 is with its own exclusive code EC, only the tire pressure sensor(s) 400 corresponding to the exclusive code EC specified by the switch command will be switched to the joint code JC mode. After the tire pressure sensors 400 are switched to the joint code JC mode, the transmitting unit 210 sends a burning command to these tire pressure sensors 400 to unilaterally burn the communication protocol into these tire pressure sensors 400. Further, since only the tire pressure sensor 400 in the joint code JC mode will receive the communication protocol, it is not necessary to confirm whether the communication protocol is erroneously sent to other tire pressure sensors 400. Besides, the communication protocol sent by the transmitting unit 210 to each tire pressure sensor 400 is the same (the communication protocol data is common), so there is no need to repeatedly confirm whether each of the tire pressure sensors 400 receives the data correctly.

It can be seen from the above description that the tire pressure sensor burning device 100 uses the joint code JC as a common code, so that the identification codes of all tire pressure sensors 400 are switched to the same during the burning process. With the switching mechanism, the operator can ensure that the communication protocol is transmitted to the set tire pressure sensor 400, thus there is no need to request the receiver to reply whether the packet has been transmitted correctly.

As shown in FIG. 4, for the burning tool 200, the transmission target of the communication protocol are the tire pressure sensors 400 recognized as the joint code JC. Therefore, the joint code JC can be utilized by the burning tool 200 to concurrently burn the communication protocol into the multiple tire pressure sensors 400.

It is noted that the trigger command should not limit the present disclosure. In the case without sending the trigger command, the transmitting unit 210 can still request the tire pressure sensor 400 to switch its identification code mode. Moreover, the switch command and the burning command can be combined into a single command.

Please refer back to FIG. 2, since the transmitting unit 210 does not request the tire pressure sensors 400 to respond its packet reception during the burning process of the communication protocol, the transmitting unit 210 may further, after the burning of the communication protocol is completed, sends a responding command to the transmitting unit 420 of each tire pressure sensor 400. Specifically, the responding command includes a verification program and a responding program. The verification program is that the CPU 440 reads the memory 410 to verify the burning result of the communication protocol. The responding program is that the transceiving unit 420 responds the result of the verification program by CPU 440 and the exclusive code EC to the transmitting unit 210.

The transmitting unit 210 may be implemented as a Bluetooth transmitter or a radio frequency transmitter. In the case that the transmitting unit 210 is a Bluetooth transmitter, the tire pressure sensor may have a Bluetooth receiver, and the communication protocol can also be burned into the tire pressure sensor 400 by the Bluetooth communication protocol.

Except for the tire pressure sensor burning device 100, the present disclosure provides a tire pressure sensor 400 as another independent embodiment. In FIG. 2, the tire pressure sensor 400 substantially includes a memory 410, a transceiving unit 420, a power module 430 and a CPU 440. The memory 410 is configured to store the exclusive code EC, the joint code JC and other essential programs. The transceiving unit 420 includes a Bluetooth receiver 421 and/or a radio frequency receiver 422. The radio frequency receiver 422 can transmit data via various frequency bands, such as LF and RF. Also, the exclusive code EC and the joint code JC can also be written into the memory 410 via transceiving unit 420 or be edited in the memory 410. The Bluetooth receiver 421 and the radio frequency receiver 422 can also correspond to different transmitting units 210 which are set to different transmission frequency. Namely, the transmission path of the communication protocol is not limited herein. Furthermore, since the Bluetooth receiver 421 and the radio frequency receiver 422 may includes their own data storage units (such as IC chips), the exclusive code EC and the joint code JC can also be obtained from the codes pre-stored in these receivers.

The transceiving unit 420 is configured to communicate with the transmitting unit 210 of the burning tool 200, and so as to receive the switch command and the burning command. As described above, the CPU 440 switches the mode of the tire pressure sensor 400 from the exclusive code EC mode to the joint code JC mode when the transceiving unit 420 receives switch command. In addition, when receiving the burning command, the CPU 440 drives the transceiving unit 420 to receive the communication protocol and writes it into the memory 410.

The tire pressure sensor 400 further includes several sensors connected with the power module 430 and CPU 440 such as a voltage sensing unit 450, an acceleration sensing unit 460, a tire pressure sensing unit 470 and a temperature sensing unit 480.

As shown in FIG. 3 and FIG. 4, for the case that only one or more tire pressure sensors 400 are selected to be burned, the transceiving unit 420 can first respond the exclusive code EC to the transmitting unit 210 when receiving the switch command, thus the burning tool 200 can recognize these tire pressure sensors 400. Therefore, the operator is allowed to select the tire pressure sensors 400 to be burned on the burning tool 200, and thereafter sends the switch command and the burning command to the selected tire pressure sensors 400.

After the burning of the communication protocol is completed, each of the transceiving units 420 may respond the burning result of the communication protocol and the exclusive code EC of the tire pressure sensor 400 thereof to the transmitting unit 210. The response mechanism is applicable to the operator to confirm whether the communication protocol has been completely transmitted, or some missing data needs to be retransmitted.

Figure 5:
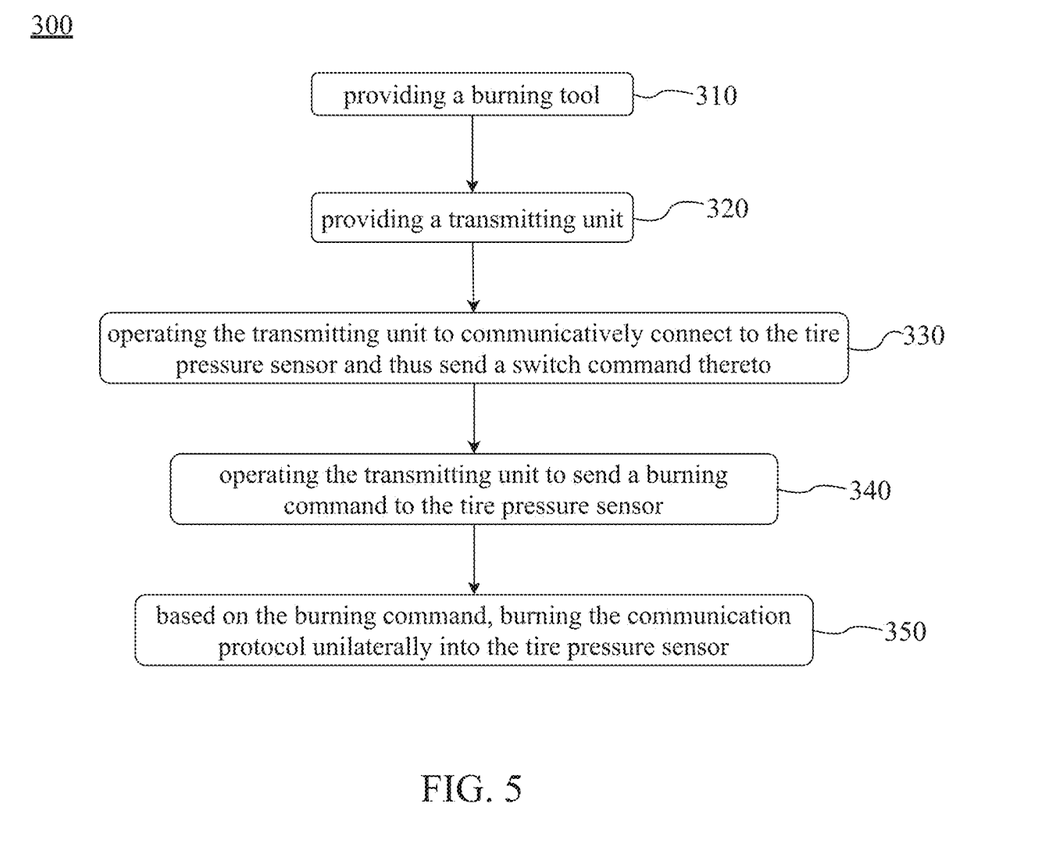
FIG. 5 is a flow chart of tire pressure sensor burning method according to yet another embodiment of the present disclosure.

Referring to FIG. 5, according to another embodiment of the present disclosure, a tire pressure sensor burning method 300 for burning at least one tire pressure sensor 400. The tire pressure sensor 400 stores or inputs the exclusive code EC and the joint code JC externally. The tire pressure sensor burning method 300 includes the following steps. Step 310 is to provide the burning tool 200 in which the communication protocol corresponding to a car model is stored. The step 320 is to provide the transmitting unit 210. The step 330 is to operate the transmitting unit 210 to communicatively connect to the tire pressure sensor 400 and thus send a switch command thereto. The switch command switches the mode of the tire pressure sensor 400 from the exclusive code EC mode to the joint code JC mode. The step 340 is to operate the transmitting unit 210 to send the burning command to the tire pressure sensor 400. The step 350 is to burn the communication protocol unilaterally into the tire pressure sensor 400 based on the burning command. The principle of implementing the tire pressure sensor burning method 300 has been described as the aforementioned tire pressure sensor burning device 100, so it will not be repeated herein.

The tire pressure sensor burning method 300 may further include: providing the data inputting unit 220 and operate it to obtain the exclusive code EC or the joint code JC from the outside of the burning tool 200. Optionally the data inputting unit 220 can be used to input the exclusive code EC or the joint code JC and the transmitting unit 210 can be operated to write the exclusive code EC or joint code JC into the tire pressure sensor 400.

In one embodiment, the tire pressure sensor burning method 300 is for burning a plurality of tire pressure sensors 400, and the joint code JC of each of the tire pressure sensors 400 are the same. The tire pressure sensor burning method 300 may further include: operating the burning tool 200 to concurrently burn the communication protocol into the tire pressure sensors 400 with the joint code JC.

The tire pressure sensor burning method 300 may further include: after the burning of the communication protocol is completed, operating the transmitting unit 210 to send a responding command to the tire pressure sensor 400. The responding command includes a verification program and a responding program. The verification program is to verify the burning result of the communication protocol, and the responding program is to respond the result of the verification program and the exclusive code EC to the transmitting unit 210.

Figure 6:
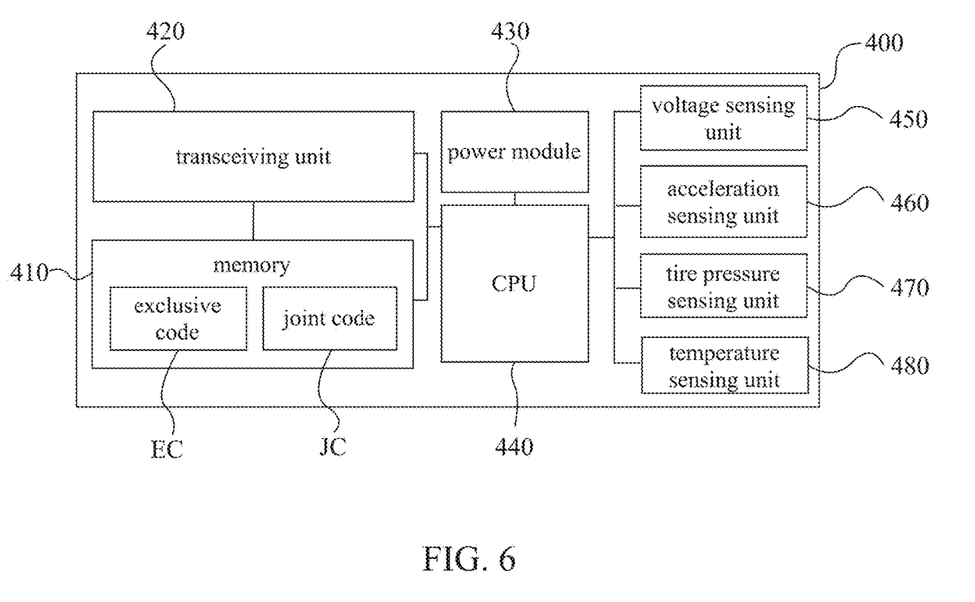
FIG. 6 is a block diagram of a tire pressure sensor according to still another embodiment of the present disclosure.

Please refer to FIG. 6, the present disclosure further provides a tire pressure sensor 400 for receiving a communication protocol corresponding to a car model. The tire pressure sensor 400 includes a memory 410, a transceiving unit 420, a power module 430, a CPU 440, a voltage sensing unit 450, an acceleration sensing unit 460, a tire pressure sensing unit 470 and a temperature sensing unit 480. The memory 410 is configured to store or be input from outside a first identification code and a second identification code, and the first identification code or the second identification code is applicable for receiving the communication protocol. The transceiving unit 420 is for receiving external signals. The power module 430 is configured to supply power to each element of the tire pressure sensor 400. The CPU is connected with the memory 410, the transceiving unit 420 and the power module 430. The voltage sensing unit 450 is for sensing a voltage value of the tire pressure sensor 400 and connecting with the CPU 440 to transmit the voltage value thereto. The acceleration sensing unit 460 is for sensing an acceleration value of the tire pressure sensor 400 and connecting with the CPU 440 to transmit the acceleration value thereto. The tire pressure sensing unit 470 is for sensing a pressure value of the tire pressure sensor 400 and connecting with the CPU 440 to transmit the pressure value thereto. The temperature sensing unit 480 is for sensing a temperature value of the tire pressure sensor 400 and connecting with the CPU 440 to transmit the temperature value thereto.

In this embodiment, the first identification code may be an exclusive code EC and the second identification code may be a joint code JC.

It can be seen from the above embodiments that the present disclosure includes at least the beneficial effects as follows. First, with the exclusive code and the joint code, the present disclosure determines the tire pressure sensors which are to be burned before transmitting the communication protocol. Accordingly, it is not necessary for the present disclosure to repeatedly request the tire pressure sensor to check and respond the packet transmission during the burning process, so as the efficiency for burning the communication protocol can be increased. Second, the joint code is as a unified code during the burning process, and only the tire pressure sensors switched to the joint code mode will receive the communication protocol. Therefore, the joint code mode allows the operator to burn the communication protocol into multiple tire pressure sensors concurrently, this replaces the existing transmission mechanism that each tire pressure sensor must be burned in sequence.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A tire pressure sensor burning device for burning at least one tire pressure sensor having or being externally inputted an exclusive code and a joint code, the tire pressure sensor burning device comprising:
   a burning tool in which a communication protocol corresponding to a car model is stored, the burning tool comprising:
   a transmitting unit communicatively connected with the tire pressure sensor and sending a switch command thereto for switching the mode of the tire pressure sensor from the exclusive code to the joint code;
   wherein the burning tool sends a burning command to the tire pressure sensor with the transmitting unit, and unilaterally burns the communication protocol into the tire pressure sensor via the joint code.

2. The tire pressure sensor burning device of claim 1, wherein the tire pressure sensor burning device is for burning a plurality of tire pressure sensors, and the joint code of each of the tire pressure sensors are the same.

3. The tire pressure sensor burning device of claim 2, wherein the communication protocol is concurrently burned into the tire pressure sensors.

4. The tire pressure sensor burning device of claim 1, wherein the burning tool further comprising:
   a data inputting unit for inputting or externally receiving the exclusive code or the joint code from the outside of the burning tool, and the data inputting unit is communicatively connected with the transmitting unit to write the exclusive code or the joint code into the tire pressure sensor.

5. The tire pressure sensor burning device of claim 4, wherein the data inputting unit is a wireless receiver, a camera lens, a recorder or a keyboard.

6. The tire pressure sensor burning device of claim 4, wherein the data inputting unit is a bar code scanner, and the exclusive code is displayed on the tire pressure sensor in the form of a bar code.

7. The tire pressure sensor burning device of claim 1, wherein the transmitting unit is a Bluetooth transmitter or a radio frequency transmitter.

8. The tire pressure sensor burning device of claim 1, wherein the transmitting unit is a Bluetooth transmitter, the tire pressure sensor has a Bluetooth receiver, and the communication protocol is transmitted from the Bluetooth transmitter to the Bluetooth receiver.

9. The tire pressure sensor burning device of claim 2, wherein the transmitting unit sends a trigger command to the tire pressure sensors, the trigger command is to request the tire pressure sensors to reply the exclusive codes thereof, and the burning tool selects at least one of the exclusive codes to sends the switch command to the tire pressure sensor corresponding to the selected exclusive code.

10. The tire pressure sensor burning device of claim 1, wherein after the burning of the communication protocol is completed, the transmitting unit sends a responding command to the tire pressure sensor, the responding command comprising:
    a verification program to verify the burning result of the communication protocol; and
    a responding program to respond the result of the verification program and the exclusive code.

11. The tire pressure sensor burning device of claim 1, wherein the burning tool is a mobile phone, a PDA or a tablet computer.

12. A tire pressure sensor burning method for burning at least one tire pressure sensor having or being externally inputted an exclusive code and a joint code, the tire pressure sensor burning method comprising the following steps:
    providing a burning tool in which a communication protocol corresponding to a car model is stored;
    providing a transmitting unit;
    operating the transmitting unit to communicatively connect to the tire pressure sensor and thus send a switch command thereto for switching the mode of the tire pressure sensor from the exclusive code to the joint code;
    operating the transmitting unit to send a burning command to the tire pressure sensor; and
    based on the burning command, burning the communication protocol unilaterally into the tire pressure sensor.

13. The tire pressure sensor burning method of claim 12, wherein the tire pressure sensor burning method is for burning a plurality of tire pressure sensors, and the joint code of each of the tire pressure sensors are the same.

14. The tire pressure sensor burning method of claim 13, further comprising:
    operating the burning tool to concurrently burn the communication protocol into the tire pressure sensors.

15. The tire pressure sensor burning method of claim 12, further comprising:
    providing a data inputting unit;
    inputting the exclusive code or the joint code on the data inputting unit; and
    operating the transmitting unit to write the exclusive code or the joint code into the tire pressure sensor.

16. The tire pressure sensor burning method of claim 12, further comprising:
    providing a data inputting unit; and
    operating the data inputting unit to obtain the exclusive code or the joint code from the outside of the burning tool.

17. The tire pressure sensor burning method of claim 12, further comprising:
    after the burning of the communication protocol is completed, operating the transmitting unit to send a responding command to the tire pressure sensor, the responding command comprising:
    a verification program to verify the burning result of the communication protocol; and
    a responding program to respond the result of the verification program and the exclusive code.

18. A tire pressure sensor for receiving a communication protocol corresponding to a car model, the tire pressure sensor comprising:
    a memory in which an exclusive code and a joint code are stored or input from outside; and a transceiving unit for receiving a switch command and a burning command;

wherein, when the transceiving unit receives the switch command, the tire pressure sensor switches the mode from the exclusive code to the joint code;

wherein, when the transceiving unit receives the burning command, the tire pressure sensor unilaterally receives the communication protocol.

19. The tire pressure sensor of claim 18, wherein the transceiving unit transmits the exclusive code outwardly when receiving the switch command.

20. The tire pressure sensor of claim 18, wherein after the burning of the communication protocol is completed, the transmitting unit transmits the burning result of the communication protocol and the exclusive code outwardly.

21. The tire pressure sensor of claim 18, wherein the transceiving unit comprises a Bluetooth receiver or a radio frequency receiver.

22. The tire pressure sensor of claim 18, wherein the transceiving unit is a Bluetooth receiver, and the communication protocol is received by the Bluetooth receiver.

* * * * *